United States Patent [19]

Emory, Jr.

[11] Patent Number: 4,610,409
[45] Date of Patent: Sep. 9, 1986

[54] TIP UP RIGGER WITH TROLLEY SUBASSEMBLY

[75] Inventor: John E. Emory, Jr., Traverse City, Mich.

[73] Assignee: Big Jon, Inc., Traverse City, Mich.

[21] Appl. No.: 674,931

[22] Filed: Nov. 26, 1984

[51] Int. Cl.⁴ .......................... A01K 97/10; B66D 3/04
[52] U.S. Cl. .................... 242/106; 43/27.4; 254/326; 254/415
[58] Field of Search ........... 242/106; 254/326, 355, 254/413, 414, 415; 43/27.4, 4, 42.13; 212/225

[56] References Cited

U.S. PATENT DOCUMENTS

| | | | |
|---|---|---|---|
| 756,170 | 3/1904 | Keating | 212/225 |
| 3,193,964 | 7/1965 | Hurst | 43/43.12 |
| 3,719,331 | 3/1973 | Harsch | 242/106 |
| 3,785,079 | 1/1974 | Rohn | 43/4 |
| 3,835,571 | 9/1974 | Berry | 43/21 |
| 3,844,058 | 10/1974 | King | 43/27.4 |
| 3,937,415 | 2/1976 | Prinz | 242/106 |
| 3,942,737 | 3/1976 | Luzi | 242/107.1 |
| 3,961,437 | 6/1976 | Lewis | 43/27.4 |
| 3,968,587 | 7/1976 | Kammeraad | 43/27.4 |
| 4,014,127 | 3/1977 | Turner | 43/27.4 |
| 4,050,180 | 9/1977 | King | 43/27.4 |
| 4,128,960 | 12/1978 | Marek | 43/27.4 |
| 4,156,320 | 5/1979 | Kammeraad | 43/27.4 |
| 4,248,002 | 2/1981 | McNellis | 43/274 |
| 4,376,350 | 3/1983 | Bednarz et al. | 43/26.1 |
| 4,388,774 | 6/1983 | Thoemke | 43/21.2 |

FOREIGN PATENT DOCUMENTS

| | | | |
|---|---|---|---|
| 2228426 | 10/1975 | France | 43/27.4 |
| 2417255 | 10/1979 | France | 43/27.4 |

*Primary Examiner*—Billy S. Taylor
*Attorney, Agent, or Firm*—Price, Heneveld, Huizenga & Cooper

[57] ABSTRACT

A rigger for trolling a fishing lure at a desired depth includes an elongated arm having a free end and an end pivotally secured to a mounting base. A trolley is slidably mounted on the arm for movement towards and away from the free end of the arm. A downrigger line pulley is secured to the trolley for movement therewith. A downrigger line reel is mounted on the base and a downrigger line or cable extends over the downrigger pulley. An elastic cord has ends fixed to the trolley for biasing the trolley towards the free end of the arm. A latch is provided to secure the arm in a vertical or tipped up position.

21 Claims, 5 Drawing Figures

TIP UP RIGGER WITH TROLLEY SUBASSEMBLY

BACKGROUND OF THE INVENTION

The present invention relates to fishing and boating equipment and more particularly to a downrigger device for maintaining the depth of a lure or bait attached to a fishing line during trolling operations.

In sport or commercial trolling fishing operations, the bait or lure is maintained at a desired depth. The bait or lure is positioned by an outrigger or downrigger system. Typically, such a system would include an arm which extends from the boat and supports a downrigger line pulley. A reel mounted adjacent the arm has a downrigger line which extends along the arm and over the pulley. A weight is attached to the end of the downrigger line. The fishing line is attached to the downrigger line by a suitable line release device. The downrigger weight is lowered to the desired depth thereby carrying the fishing line downwardly and the lure or bait trails from the downrigger line in a generally horizontal fashion. When the line or bait is struck by a fish, the fishing line is released from the downrigger line.

Examples of various rigger systems may be found in U.S. Pat. No. 3,193,964 entitled OUTRIGGER FISHING LINE GUIDE and issued on July 13, 1965 to Hurst; U.S. Pat. No. 3,719,331 entitled DOWNRIGGER and issued on Mar. 6, 1973 to Harsch; U.S. Pat. No. 4,128,960 entitled WEIGHT ARRESTER and issued on Dec. 12, 1978 to Marek; U.S. Pat. No. 4,248,002 entitled DOWNRIGGER SYSTEM and issued on Feb. 3, 1981 to McNellis; and U.S. Pat. No. 4,388,774 entitled FISHING SYSTEM and issued on June 21, 1983 to Thoemke. An example of the fishing line release may be found in commonly owned U.S. Pat. No. 4,173,091 entitled DOWNRIGGER LINE RELEASE and issued on Nov. 6, 1979 to Emory, Jr.

When using such systems, it is desirable to position the downrigger line and the fishing line at a sufficient distance from the boat to prevent interference with the boat hull and entanglement with the boat propeller. When the system employs an elongated arm to position the fishing line away from the boat, difficulties are experienced with attaching the fishing line to the downrigger line release, retrieving the weighted end of the downrigger line and/or stowing elements of the system. Unless provision is made for moving the weighted end of the downrigger line towards the boat, the operator will have to reach outwardly over the side or stern of the boat.

Various proposals have been made for retrieving the weighted end of the downrigger line or cable. In some systems, the downrigger system swivels or pivots so that the free end of the arm can be moved towards the boat. In other systems, the arm is retractable back towards the boat. Also, as disclosed in the aforementioned McNellis patent, it has been proposed to use a carriage assembly and a drive member secured to the downrigger cable which engages the carriage and moves the free end of the cable inwardly towards the boat when the cable is retrieved.

SUMMARY OF THE INVENTION

In accordance with the present invention, a system is provided by which the weighted end of a rigger line or cable may be easily retrieved and positioned to be reached by the operator. Essentially, the system includes a base mountable on the boat, an elongated rigger arm extending outwardly from the base, a trolley or carriage slidably mounted on the arm and a downrigger line or cable pulley supported by the trolley. Provision is made for biasing the trolley outwardly towards a free end of the elongated arm. The downrigger line or cable extends over the pulley and supports the downrigger weight or ball.

In narrower aspects of the invention, the downrigger arm is pivoted to the base and may be latched in a tipped up or essentially vertical position with respect to the base. When the downrigger line is retrieved, the trolley will move towards the base and the weighted end of the downrigger line or cable will be positioned for easy grasp by the operator.

DETAILED DESCRIPTION OF THE PREFERRED EMBODIMENT

Figure 1:
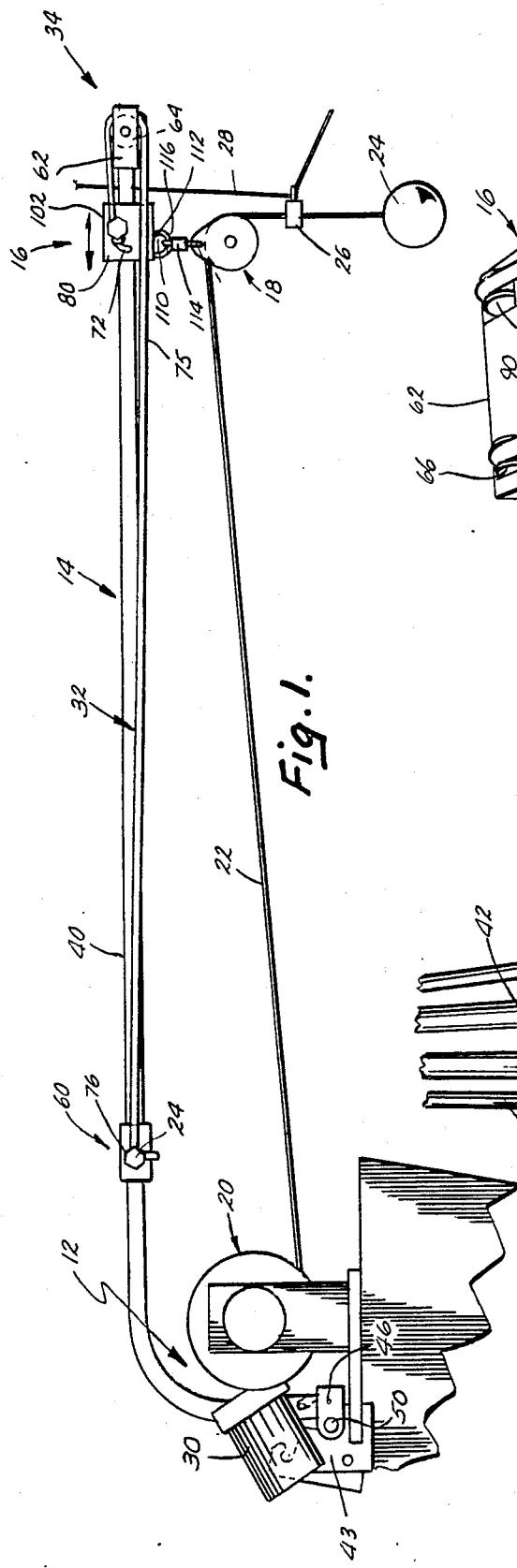
FIG. 1 is a side, elevational view of a rigger in accordance with the present invention.

The preferred embodiment of the rigger system in accordance with the present invention is illustrated in FIG. 1 and generally designated 10. System 10 includes a mounting base or frame 12, an elongated arm 14 pivotally secured to base 12, a trolley or carriage subassembly 16 and a downrigger line or cable pulley 18. Mounted on base 12 is a downrigger cable reel 20. Reel 20 contains a downrigger cable 22 which extends outwardly therefrom and over pulley 18. Secured to line 22 is a downrigger weight or ball 24. A fishing line release 26 is secured to line 22 adjacent ball 24. A fishing line 28 is carried by release 26. Reel 20 is preferably driven by a reversible electric motor 30 in a conventional fashion. In the alternative, the reel may be hand or crank operated. Biasing means 32 biases trolley 16 towards a free end 34 of arm 14.

Figure 2:
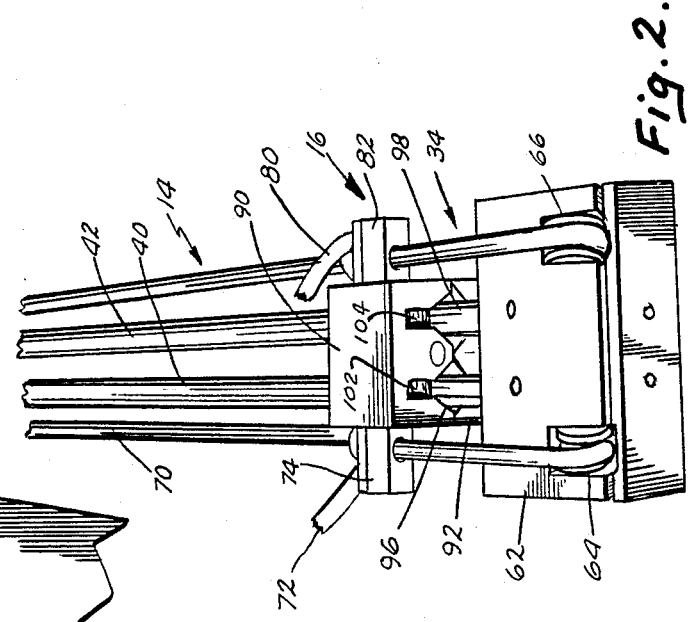
FIG. 2 is an enlarged, fragmentary, front perspective view of the rigger of FIG. 1.
Figure 3:
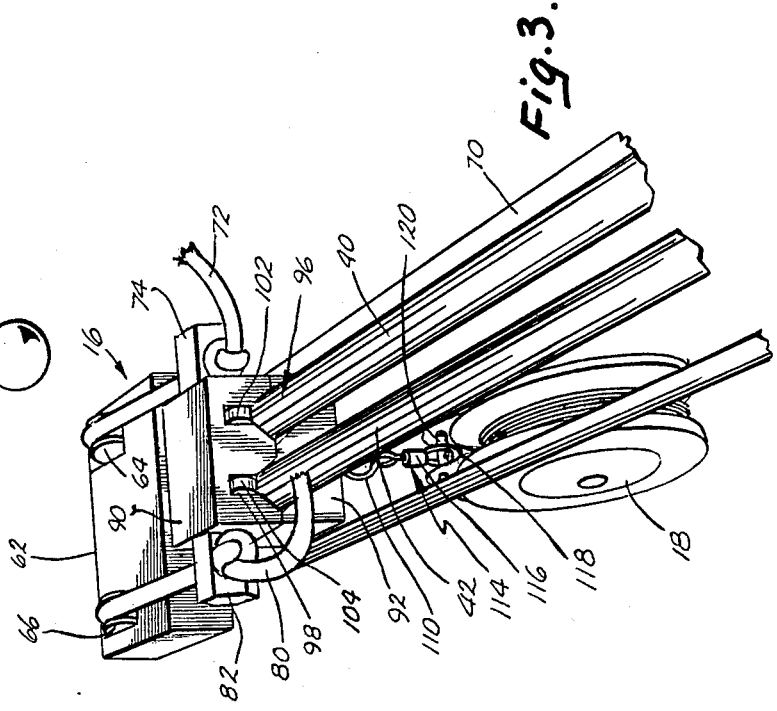
FIG. 3 is an enlarged, fragmentary, rear perspective view.
Figure 4:
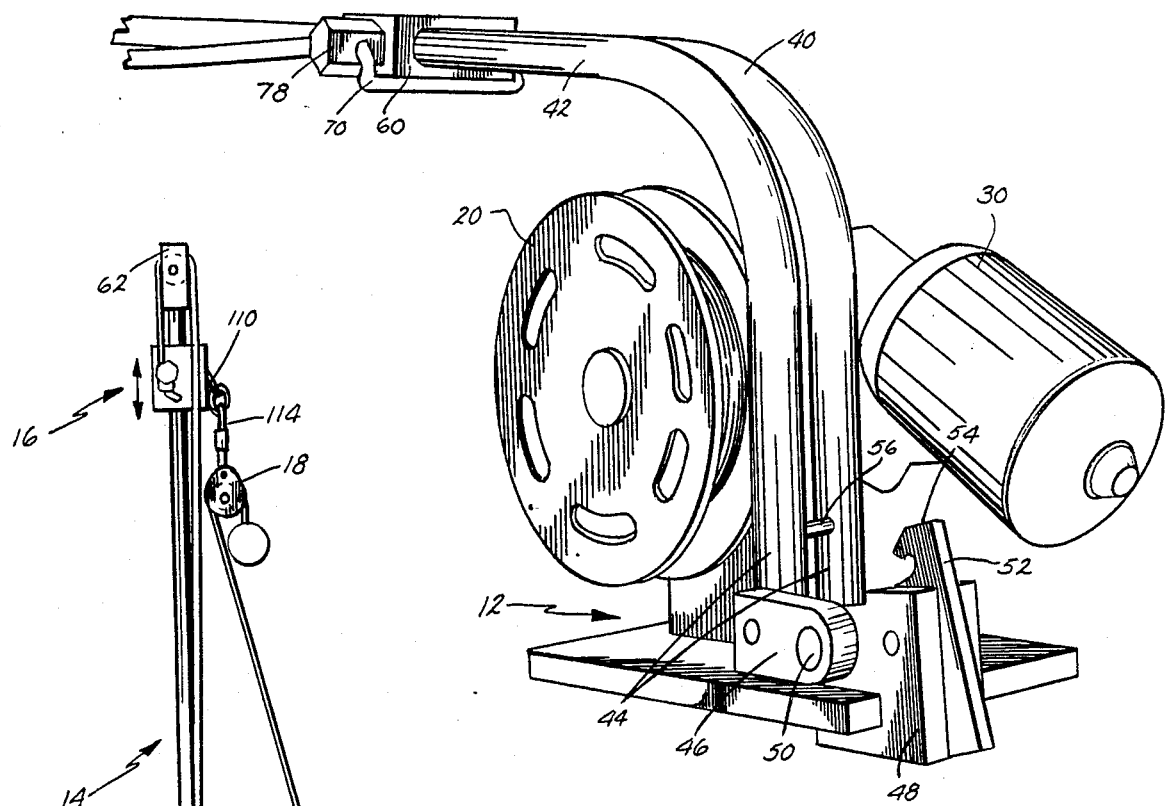
FIG. 4 is an enlarged, fragmentary, side perspective view of the base and arm of the rigger.

As best seen in FIGS. 2, 3 and 4, arm 14 includes a pair of elongated, generally L-shaped rods 40, 42 which extend in spaced, parallel relationship to each other. Ends 44 of rods 40, 42 are joined to a pivot block 46. A support block 48 is fixed to base 12. A pivot pin 50 extends through blocks 46 and 48 to pivotally mount the elongated rods to the base. Supported on block 48 is a pivotal latch 52. Latch 52 includes a hooked end 54. End 54 is configured to engage a latch pin 56 which extends between rods 40, 42. Arm 14, therefore, may be pivoted from a horizontal position (FIG. 1) to a vertical position (FIG. 5) wherein the elongated portions of the rods are generally perpendicular to the base 12. When in this latter, tipped up position, latch pin 56 is within hooked end 54 of latch 52.

Supported on rods 40, 42 at a position above and adjacent reel 20 is a rear stop 60. A forward or front stop 62 is secured to rods 40, 42 adjacent free end 34 of the elongated arm. As seen in FIGS. 2 and 3, a pair of pulleys 64, 66 are rotatably supported on the front stop 62.

In the preferred form, biasing means 32 comprises an elastic cord 70. Cord 70 includes an end 72 fixed to a post 74 carried by trolley 16. The cord 70 extends forwardly over pulley 64 and then rearwardly to stop 60. Cord 70 loops through posts 76, 78 on stop 16, forwardly over pulley 66 and has an end 80 secured to post 82 on trolley 16. Since the elastic cord extends over pulleys 64, 66, the cords will be in tension and bias trolley 16 toward the free end 34 of the downrigger arm.

As seen in FIGS. 2 and 3, trolley 16 includes a pair of opposed blocks 90, 92. Blocks 90, 92 define a pair of passages or throughbores 96, 98 through which rods 40, 42 extend. The blocks, therefore, ride on the elongated rods. It is presently preferred that trolley 16 include slide means to insure reliable, nonbinding movement. In the preferred form the slide means comprises rollers 102, 104 at passages 96, 98. The rollers act as bearings and ride on the upper surfaces of rods 40, 42. The rollers insure smooth sliding movement of trolley 16 along rods 40, 42.

As seen in FIG. 1, a ring 110 is secured to block 92 by a suitable pin 112. A swivel 114 has a ring 116 extending through ring 110. Another ring 118 of swivel 114 is attached to pulley 18 by a suitable fastener 120. Pulley 18, therefore, is mounted in a swivel fashion to carriage 16 and pulley 18 moves with the carriage.

OPERATION

Figure 5:
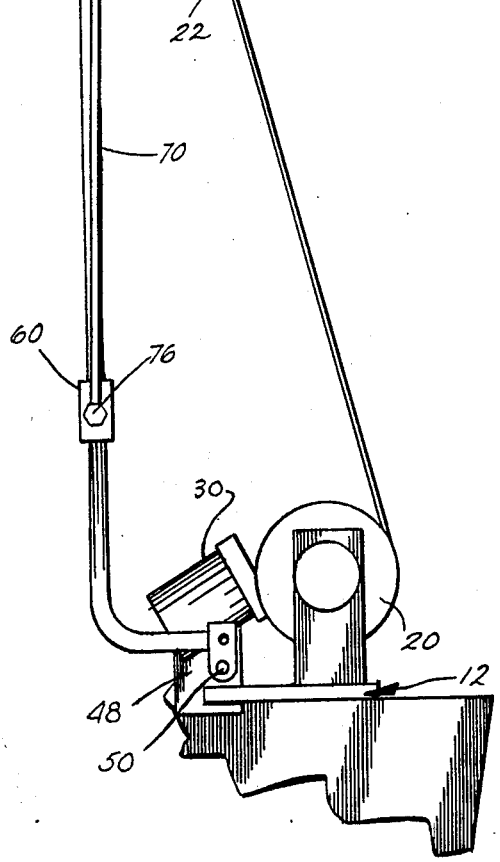
FIG. 5 is a side, elevational view with the arm of the rigger in a latched, vertical position.

To use the rigger system in accordance with the present invention, the base or mounting means 12 is secured to a gunwale or transom of the boat. The downrigger arm may be stowed in the vertical, tipped up or latched position as shown in FIG. 5. When in this position, the downrigger ball or weight 24 is easily secured to the end of downrigger cable 22. The trolley may be manually grasped and pulled downwardly against the bias of cord 32. In the alternative, line may be reeled in by rotating reel 20 and thereby pulling the trolley downwardly toward stop 60. In order to commence trolling, latch 52 is released from latch pin 56 and line 22 is reeled out. Arm 14 is pivoted to its operating or horizontal position, as illustrated in FIG. 1. Biasing means 32 will shift trolley 16 outwardly towards stop 62 at free end 34 of the arm. In order to retrieve weight 24 or attach a fishing line 28 to the downrigger cable or line, cable 22 is reeled in and trolley 16 is pulled rearwardly towards stop 60. During trolling operations, should the ball or weight 24 contact the bottom, trolley 16 may shift along rods 40, 42. With prior systems where the downrigger line pulley was fixed to the rod, contacting of the bottom could result in separation of the ball or weight from the downrigger cable.

The carriage or trolley and elongated rods of the preferred embodiment of the present invention insure that the carriage moves freely and without binding along the arm between the front and rear stops. The use of an elastic cord which passes over a pair of pulleys at the free end of the arm insures that an equal force is applied to the trolley. This prevents twisting or binding of the trolley on the rods. The downrigger arm is easily and readily stowed in a vertical position. The downrigger pulley and hence the weighted end of the downrigger line maybe readily retrieved by the operator without having to reach over the side or stern of the boat.

In view of the foregoing description, those of ordinary skill in the art will undoubtedly envision various modifications which would not depart from the inventive concepts disclosed herein. For example, a pair of elastic cords could be used for the single cord illustrated. Further, a plain bearing arrangement could be used to slidably mount the carriage on the downrigger arm. The roller bearing arrangement is preferred, however, to insure ease of movement and reliability. It is expressly intended, therefore, that the above description should be considered as only that of the preferred embodiment. The true spirit and scope of the present invention may be determined by reference to the appended claims.

The embodiments of the invention in which an exclusive property or privilege is claimed are defined as follows:

1. A rigger subassembly comprising:
    a base adapted to be secured to a boat;
    an elongated arm connected to and extending outwardly from said base, said arm having a free end;
    a trolley slidably mounted on said arm for movement between a position adjacent said base and a position adjacent said free end;
    a stop on said arm on limit movement of said trolley towards said free end;
    a downrigger line pulley secured to said trolley for movement on said arm;
    biasing means engaging said trolley for biasing said trolley towards said free end;
    pivot means between said arm and said base for pivoting said arm to said base; and
    latch means on said base for latching said arm in a tip up position generally perpendicular to said base, 2. A rigger subassembly as defined by claim 1 further including swivel means connected to said trolley and said pulley for swiveling said pulley to said trolley.

3. A rigger subassembly as defined by claim 2 wherein said trolley includes rollers riding on said arm.

4. A rigger subassembly as defined by claim 2 wherein said arm includes a pair of spaced, parallel, elongated rods which define said arm.

5. A rigger subassembly as defined by claim 4 wherein said trolley defines a pair of bores through which said rods extend.

6. A rigger subassembly comprising:
    a base adapted to be secured to a boat;
    an elongated arm connected to and extending outwardly from said base, said arm having a free end;
    a trolley slidably mounted on said arm for movement between a position adjacent said base and a position adjacent said free end;
    a stop on said arm to limit movement of said trolley towards said free end;
    a downrigger line pulley secured to said trolley for movement on said arm;
    biasing means engaging said trolley for biasing said trolley towards said free end;
    said arm including a pair of spaced, parallel, elongated rods which define said arm, said trolley defining a pair of bores through which said rods extend and wherein said biasing means comprises an elastic cord having an end fixed to said arm and another end fixed to said trolley.

7. A rigger subassembly as defined by claim 10 further including a cord pulley mounted at said arm free end, said cord extending along said arm, and over said cord pulley to said trolley so that said cord is maintained in tension during movement of said trolley.

8. A rigger subassembly comprising:
    a base adapted to be secured to a boat;

an elongated arm connected to and extending outwardly from said base, said arm having a free end;
a trolley slidably mounted on said arm for movement between a position adjacent said base and a position adjacent said free end;
a stop on said arm to limit movement of said trolley towards said free end;
a downrigger line pulley secured to said trolley for movement on said arm;
biasing means engaging said trolley for biasing said trolley towards said free end, said biasing means comprising an elastic cord having an end fixed to said arm and another end fixed to said trolley.

9. A rigger subassembly as defined by claim 8 further including a cord pulley mounted at said arm free end, said cord extending along said arm, and over said cord pulley to said trolley so that said cord is maintained in tension during movement of said trolley.

10. A rigger subassembly as defined by claim 3 wherein said biasing means comprises an elastic cord having an end fixed to said arm and another end fixed to said trolley.

11. A rigger subassembly as defined by claim 10 further including a cord pulley mounted at said arm free end, said cord extending along said arm and over said cord pulley to said trolley so that said cord is maintained in tension during movement of said trolley.

12. A rigger mountable on a boat for trolling a fishing line at a desired depth, said rigger comprising:
an elongated arm having a free end;
mounting means supporting said arm for mounting said arm on a boat;
a carriage;
slide means on said carriage for slidably mounting said carriage on said arm for longitudinal movement along said arm;
a rigger line pulley connected to said carriage;
a reeel on said mounting means, said reel carrying a rigger line extending over said pulley;
biasing means engaging said carriage for biasing said carriage towards said free end of said arm, said mounting means comprising:
a base;
pivot means engaging said arm for pivoting said arm to said base; and
latch means on said base for releasably latching said arm in a position extending generally perpendicular to said base.

13. A rigger as defined by claim 12 further including:
a rear stop on said arm for limiting movement of said carriage towards said base; and
a front stop on said arm adjacent said free end for limiting movement of said carriage towards said free end.

14. A rigger mountable on a boat for trolling a fishing line at a desired depth, said rigger comprising:
an elongated arm having a free end;
mounting means supporting said arm for mounting said arm on a boat;
a carriage;
slide means on said carriage for slidably mounting said carriage on said arm for longitudinal movement along said arm;
a rigger line pulley connected to said carriage;
a reel on said mounting means, said reel carrying a rigger line extending over said pulley;
biasing means engaging said carriage for biasing said carriage towards said free end of said arm, said biasing means comprising an elastic cord having an end fixed with respect to said arm and another end secured to said carriage.

15. A rigger as defined by claim 14 further including a cord pulley adjacent the free end on the arm, said elastic cord extending over said cord pulley.

16. A rigger as defined by claim 14 wherein said arm comprises a pair of elongated, spaced, parallel rods.

17. A rigger as defined by claim 16 wherein said carriage comprises:
a block defining a pair of passages through which said rods extend, and said slide means includes bearings supported on said block and riding on said rods.

18. A rigger as defined by claim 17 further including:
a rear stop on said arm for limiting movement of said carriage towards said base; and
a front stop on said arm adjacent said free end for limiting movement of said carriage towards said free end.

19. A rigger mountable on a boat for trolling a fishing line at a desired depth, said rigger comprising:
an elongated arm having a free end;
mounting means supporting said arm for mounting said arm on a boat;
a carriage;
slide means on said carriage for slidably moûnting said carriage on said arm for longitudinal movement along said arm;
a rigger line pulley connected to said carriage;
a reel on said mounting means, said reel carrying a rigger line extending over said pulley;
biasing means engaging said carriage for biasing said carriage towards said free end of said arm, said arm comprising a pair of elongated spaced, parallel rods, said carriage comprising a block defining a pair of passages through which said rods extend, and said slide means includes bearings supported on said block and riding on said rods;
a rear stop on said arm for limiting movement of said carriage towards said base; and
a front stop on said arm adjacent said free end for limiting movement of said carriage towards said free end, said biasing means comprising an elastic cord, said cord having ends fixed to said carriage and wherein said cord is looped around said rear stop.

20. A rigger as defined by claim 19 further including a pair of cord pulleys rotatably mounted adjacent said from stop, said elastic cord extending over said cord pulleys.

21. A rigger as defined by claim 20 wherein said mounting means comprises:
a base;
pivot means engaging said arm for pivoting said arm to said base; and said arm in a position extending generally perpendicular to said base.

* * * * *

UNITED STATES PATENT AND TRADEMARK OFFICE
CERTIFICATE OF CORRECTION

PATENT NO. : 4,610,409

DATED : September 9, 1986

INVENTOR(S) : John E. Emory, Jr.

It is certified that error appears in the above-identified patent and that said Letters Patent is hereby corrected as shown below:

Column 4, line 22:
"on" (second occurrence) should be --to--;

Column 4, line 62:
"claim 10" should be --claim 6--;

Column 5, line 41:
"reeel" should be --reel--;

Column 6, line 57:
"from" should be --front--; and

Column 6, line 63:
After "; and" insert --latch means on said base for releasably latching--.

Signed and Sealed this

Seventeenth Day of March, 1987

Attest:

DONALD J. QUIGG

Attesting Officer  Commissioner of Patents and Trademarks